(12) United States Patent
Ishimaru (10) Patent No.: US 8,702,817 B2
(45) Date of Patent: *Apr. 22, 2014

(54) METHOD OF MANUFACTURING SOLID ELECTROLYTIC CAPACITOR

(71) Applicants: Sanyo Electric Co., Ltd., Moriguchi (JP); Saga Sanyo Industries Co., Ltd., Saga (JP)

(72) Inventor: Yoshiaki Ishimaru, Kanzaki (JP)

(73) Assignees: SANYO Electric Co., Ltd., Moriguchi-shi (JP); SAGA SANYO INDUSTRIES Co., Ltd., Kishima-gun (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/838,566

(22) Filed: Mar. 15, 2013

(65) Prior Publication Data

US 2013/0202784 A1 Aug. 8, 2013

Related U.S. Application Data

(62) Division of application No. 12/949,226, filed on Nov. 18, 2010, now Pat. No. 8,419,809.

(30) Foreign Application Priority Data

Nov. 20, 2009 (JP) .................. 2009-265322

(51) Int. Cl.
*H01G 9/00* (2006.01)
(52) U.S. Cl.
USPC ........................................ 29/25.03
(58) Field of Classification Search
None
See application file for complete search history.

(56) References Cited

U.S. PATENT DOCUMENTS

| 5,972,052 | A | 10/1999 | Kobayashi et al. |
| 6,946,211 | B1 | 9/2005 | Bjerrum et al. |
| 8,419,809 | B2 * | 4/2013 | Ishimaru ............... 29/25.03 |
| 2002/0173579 | A1 | 11/2002 | Jonas et al. |
| 2005/0248910 | A1 | 11/2005 | Merker |
| 2010/0284129 | A1 | 11/2010 | Sugihara et al. |

FOREIGN PATENT DOCUMENTS

| JP | 09-320898 A | 12/1997 |
| JP | 2000-106329 A | 4/2000 |
| JP | 2002-524593 A | 8/2002 |
| JP | 2002-270466 A | 9/2002 |

(Continued)

OTHER PUBLICATIONS

Decision to Grant a Patent dated Aug. 20, 2013, issued in corresponding Japanese Patent Application No. 2009-265322, w/ English translation.

*Primary Examiner* — Seahvosh Nikmanesh
(74) *Attorney, Agent, or Firm* — Westerman, Hattori, Daniels & Adrian, LLP (57) ABSTRACT

A method of manufacturing a solid electrolytic capacitor having an even conductive polymer layer includes the steps of forming a conductive polymer layer on an anode element by bringing a dispersion containing a conductive solid and a first solvent into contact with the anode element having a dielectric film formed thereon, washing the anode element with a second solvent higher in boiling point than the first solvent, in which the conductive solid can be dispersed, after the conductive polymer layer is formed, and drying the anode element washed with the second solvent at a temperature not lower than the boiling point of the first solvent and lower than the boiling point of the second solvent.

6 Claims, 3 Drawing Sheets

(56) References Cited

FOREIGN PATENT DOCUMENTS

| | | | |
|---|---|---|---|
| JP | 2004-532298 A | 10/2004 |
| JP | 2005-109252 A | 4/2005 |
| JP | 2005-322917 A | 11/2005 |
| JP | 2007-294495 A | 11/2007 |
| JP | 2008-251629 A | 10/2008 |
| JP | 2009-147122 A | 7/2009 |
| WO | 00/14139 A1 | 3/2000 |
| WO | 2009/131012 A1 | 10/2009 |

\* cited by examiner

METHOD OF MANUFACTURING SOLID ELECTROLYTIC CAPACITOR

This application is a divisional application of U.S. patent application Ser. No. 12/949,226 filed Nov. 18, 2010, now U.S. Pat. No. 8,419,809, and is based upon and claims the benefit of priority from Japanese Patent Application No. 2009-265322 filed with the Japan Patent Office on Nov. 20, 2009, the entire contents of which being hereby incorporated by reference.

BACKGROUND OF THE INVENTION

1. Field of the Invention

The present invention relates to a method of manufacturing a solid electrolytic capacitor, and particularly to a method of manufacturing a solid electrolytic capacitor having a conductive polymer layer, with the use of a dispersion.

2. Description of the Related Art

As electronic devices have been digitized and adapted to higher frequencies in recent years, a capacitor having a small size, a large capacity, and low impedance even in a high-frequency domain has been required. A solid electrolytic capacitor having a conductive polymer layer has been developed as a capacitor meeting this requirement. Examples of solid electrolytic capacitors include a wound-type solid electrolytic capacitor and a stack-type solid electrolytic capacitor. For example, Japanese Patent Laying-Open No. 2007-294495 discloses a stack-type solid electrolytic capacitor including a metal plate.

For the conductive polymer layer, highly conductive polypyrrole, polythiophene, polyfuran, polyaniline, and the like are employed. Such a conductive polymer layer can be formed, for example, by impregnating an anode element with a polymerization liquid containing a precursor monomer of a conductive polymer, an oxidizing agent, and a dopant and causing chemical polymerization reaction.

In the conductive polymer layer formed through chemical polymerization reaction as described above, excessive oxidizing agent or unreacted precursor monomer may remain. In this case, characteristics of the solid electrolytic capacitor may disadvantageously be lowered due to a behavior of the remaining oxidizing agent or precursor monomer. It is noted that a higher capacitance, a lower equivalent series resistance (ESR) value, or a lower leakage current (LC) value can indicate high characteristics of the solid electrolytic capacitor.

In addressing the problem above, for example, Japanese Patent Laying-Open No. 2000-106329 discloses a method of washing the conductive polymer layer with a wash such as ethanol in order to remove the excessive oxidizing agent remaining in the conductive polymer layer of the solid electrolytic capacitor. In addition, Japanese Patent Laying-Open No. 2008-251629 discloses a method of washing the conductive polymer layer with a wash solution containing a solute in order to remove the unreacted precursor monomer remaining in the conductive polymer layer of the solid electrolytic capacitor.

In the method of forming the conductive polymer layer by causing chemical polymerization reaction on the anode element as described above, polymerization reaction gradually proceeds in a polymerization liquid from the time point of preparation of the polymerization liquid. Therefore, much attention had to be paid to handling of the polymerization liquid. In addition, since chemical polymerization reaction occurs on the anode element, a dielectric film on a surface of the anode element may be damaged.

In order to address this, a method of forming a conductive polymer layer with a dispersion has recently been developed. A dispersion is a substance obtained by dispersing a conductive solid composed of a polymer in a state of particle or aggregate in a solvent, and for example, a conductive polymer layer can be formed on an anode element by immersing the anode element in the dispersion so as to bring the conductive solid and the anode element in physical contact with each other. For example, Japanese National Patent Publication No. 2004-532298 discloses a dispersion in which polythiophene is dispersed. According to this method, no chemical polymerization reaction occurs on the dielectric film, and hence the dielectric film is not damaged. In addition, since no polymerization reaction in the dispersion proceeds as in the case of the polymerization liquid described above, handling thereof is easy.

It is difficult, however, to achieve a uniform size of particles or aggregates of a conductive polymer contained in the dispersion, and hence large particles or aggregates are present in the dispersion in many cases. In this case, since a large particle cannot enter the anode element, which is a porous body, and evenness of the conductive polymer layer is lowered. Consequently, characteristics of the solid electrolytic capacitor are disadvantageously lowered.

SUMMARY OF THE INVENTION

From the foregoing, an object of the present invention is to provide a method of manufacturing a solid electrolytic capacitor having an even conductive polymer layer.

The present invention is directed to a method of manufacturing a solid electrolytic capacitor including an anode element having a dielectric film formed on its surface and a conductive polymer layer formed on the dielectric film, including the steps of: forming the conductive polymer layer on the anode element by bringing a dispersion containing a conductive solid and a first solvent into contact with the anode element having the dielectric film formed thereon; washing the anode element with a second solvent higher in boiling point than the first solvent, in which the conductive solid can be dispersed, after the conductive polymer layer is formed; and drying the anode element washed with the second solvent at a temperature not lower than the boiling point of the first solvent and lower than the boiling point of the second solvent.

Miscibility of a B solvent with a A solvent herein refers to a characteristic allowing homogeneous mixture of the A solvent and the B solvent without application of external force.

According to the present invention, a solid electrolytic capacitor having an even conductive polymer layer and a method of manufacturing the same can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described in detail with reference to the drawings. In the embodiment shown below, the same or corresponding elements have the same reference characters allotted and description thereof will not be repeated.

<Solid Electrolytic Capacitor>

Initially, a structure of a solid electrolytic capacitor manufactured with a method of manufacturing a solid electrolytic capacitor according to the present embodiment will be described. Though the manufacturing method is applicable to a chip-type solid electrolytic capacitor having an anode element made of a sintered object, a wound-type solid electrolytic capacitor having an anode element made of a metal foil, and a stack-type solid electrolytic capacitor having an anode element made of a metal plate, description will be given here with reference to a stack-type solid electrolytic capacitor.

Figure 1:
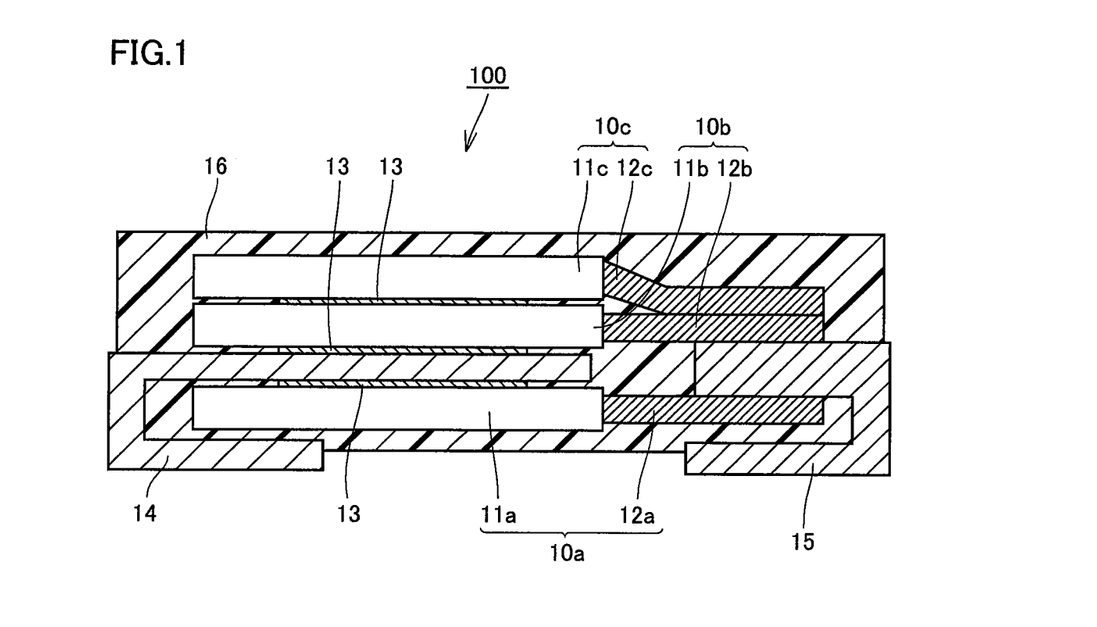
FIG. 1 is a cross-sectional view schematically showing a structure of a stack-type solid electrolytic capacitor according to one embodiment of the present invention.

FIG. 1 is a cross-sectional view schematically showing a structure of a stack-type solid electrolytic capacitor according to one embodiment of the present invention.

In FIG. 1, a solid electrolytic capacitor 100 includes three capacitor elements 10a, 10b and 10c, and capacitor elements 10a to 10c include a cathode portion 11a and an anode portion 12a, a cathode portion 11b and an anode portion 12b, and a cathode portion 11c and an anode portion 12c, respectively. Capacitor elements 10a to 10c are stacked such that the cathode portion sides and the anode portion sides thereof are aligned in the same position.

A cathode terminal 14 is arranged between cathode portion 11a and cathode portion 11b, and cathode portion 11 a and cathode terminal 14 as well as cathode portion 11b and cathode terminal 14 are bonded and fixed to each other by an adhesive conductive paste 13. Cathode portion 11b and cathode portion 11c are also bonded and fixed to each other by conductive paste 13. In addition, an anode terminal 15 is arranged between anode portion 12a and anode portion 12b, and anode portion 12a, anode terminal 15, anode portion 12b, and anode portion 12c are stacked in this order and press-fitted and fixed to one another.

Then, each portion above is covered with an exterior resin 16 so that one ends of cathode terminal 14 and anode terminal 15 are exposed. Cathode terminal 14 and anode terminal 15 exposed through exterior resin 16 are bent along a side surface and a bottom surface of solid electrolytic capacitor 100. Though solid electrolytic capacitor 100 having three capacitor elements is described in the present embodiment, the number of capacitor elements is not limited to three and it may be set to one or more. In addition, the cathode portion and the anode portion should only electrically be connected to the cathode terminal and the anode terminal, respectively, and arrangement is not limited to that in FIG. 1.

Figure 2:
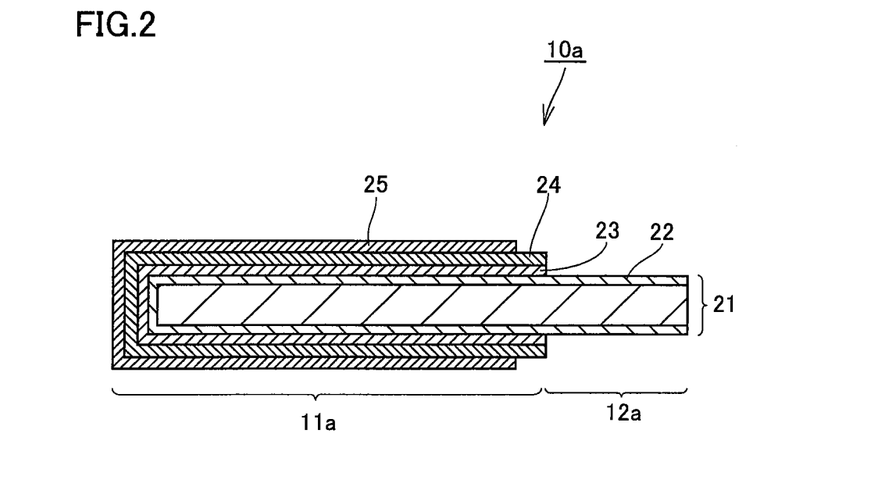
FIG. 2 is a cross-sectional view schematically showing a structure of a capacitor element in FIG. 1.

FIG. 2 is a cross-sectional view schematically showing a structure of the capacitor element in FIG. 1.

In FIG. 2, capacitor element 10a has an anode element 21 made of a valve metal foil of aluminum, niobium, tantalum, or the like, and a dielectric film 22 is formed on a surface of anode element 21. Dielectric film 22 can be formed with a known technique. For example, dielectric film 22 can be formed by immersing a valve metal foil in an aqueous solution of phosphoric acid or the like, applying a prescribed voltage, and performing chemical conversion treatment. In addition, a conductive polymer layer 23, a carbon layer 24, and a silver paste layer 25 are successively stacked on dielectric film 22. Conductive polymer layer 23, carbon layer 24, and silver paste layer 25 constitute a cathode layer. In capacitor element 10a, a portion where the cathode layer is stacked on anode element 21 serves as cathode portion 11a, and a portion where the cathode layer is not stacked but anode element 21 or dielectric film 22 is exposed serves as anode portion 12a. It is noted that capacitor elements 10b and 10c have the structure the same as capacitor element 10a.

<Method of Manufacturing Solid Electrolytic Capacitor>

A method of manufacturing solid electrolytic capacitor 100 will be described hereinafter.

<<Step of Forming Conductive Polymer Layer>>

In the present embodiment, initially, as the step of forming a conductive polymer layer, conductive polymer layer 23 is formed on anode element 21 by bringing a dispersion containing a conductive solid and a first solvent in contact with anode element 21 having dielectric film 22 formed thereon.

Here, the conductive solid refers to a substance in which a conductive polymer having a molecular weight in a range approximately from 1,000 to 1,000,000 forms particles or aggregates. Any conductive polymer applicable to a solid electrolytic capacitor may be adopted as a conductive polymer, and examples thereof include polypyrrole, polythiophene, polyfuran, or polyaniline, or a derivative thereof. Since polythiophene or a derivative thereof has high conductivity, a polymer composed of polythiophene or a derivative thereof is preferred, and in particular, a conductive polymer composed of polyethylenedioxythiophene is preferred.

In addition, any solvent in which a conductive solid can be dispersed may be adopted as a first solvent, and examples thereof include water or a solvent mixture mainly composed of water. Considering ease in handling, dispersibility of a conductive solid and the like, water is preferably adopted as a solvent for a dispersion.

Though a method of preparing the dispersion above is not particularly restricted, for example, a method of preparing the dispersion by dispersing a conductive solid such as a conductive polymer and the like in the first solvent, a method of obtaining a dispersion containing a conductive solid by polymerizing a monomer which is a precursor of a conductive polymer in the first solvent and synthesizing the conductive polymer serving as the conductive solid, and the like are available. In the case of the latter method, a purification step of removing unreacted monomer, impurities and the like is preferably provided after polymerization reaction.

A method of bringing the dispersion above in contact with anode element 21 having dielectric film 22 formed thereon is not particularly limited, and a known method can be used. Among others, a method of immersing anode element 21 in a dispersion accommodated in a container is preferably used, because an operation is relatively easy.

By immersing anode element 21 in the dispersion and thereafter bringing up anode element 21 from the dispersion, a conductive solid adheres onto anode element 21, that is, onto dielectric film 22 formed on the surface of anode element 21. Not only the conductive solid but also the first solvent are present on the surface of anode element 21 immediately after it is brought up from the dispersion. It is considered that, as the first solvent evaporates, the conductive solids are entangled to adhere and consequently conductive polymer layer 23 is formed. Therefore, in order to rapidly evaporate the first solvent adhering to anode element 21 so as to form dense conductive polymer layer 23, anode element 21 is preferably heated and dried after anode element 21 is brought up from the dispersion. For example, in an example where water is employed as the first solvent, the first solvent can rapidly evaporate by drying anode element 21 at a temperature around 100° C.

This step of forming a conductive polymer layer can be repeated a plurality of times. By repeating the step a plurality of times, the conductive solid can adhere onto dielectric film 22 densely or to a large thickness. Consequently, conductive polymer layer 23 achieving high characteristics can be formed.

<<Washing Step>>

Then, in the washing step, after conductive polymer layer 23 is formed on anode element 21, anode element 21 is washed with a second solvent higher in boiling point than the first solvent, in which the conductive solid can be dispersed.

Examples of the second solvent in which the conductive solid can be dispersed include an organic solvent having miscibility with the first solvent. If the second solvent has miscibility with the first solvent, the conductive solid can be dispersed in the second solvent, as in the case of the first solvent. In addition, examples of the second solvent in which the conductive solid can be dispersed include a solvent having viscosity not higher than 100 mPas. If the second solvent has viscosity not higher than 100 mPas, the conductive solid can readily be dispersed in the second solvent. An organic solvent having viscosity not higher than 60 mPas is more preferred as the second solvent, and an organic solvent having viscosity not higher than 25 mPas is further preferred. In particular, an organic solvent having viscosity not higher than 20 mPas is preferred.

One of organic solvents having the characteristics above or a mixture of two or more of them may be adopted as the second solvent. For example, if water is adopted as the first solvent for the dispersion, for example, such solvents as γ-butyrolactone, γ-valerolactone, ethylene carbonate, propylene carbonate, 3-methyl-2-oxazolidone, N-methyl-2-pyrrolidone, N-methyl-2-propylene, 2-ethoxyethanol, ethylene oxide, and propylene oxide having viscosity not higher than 100 mPas and higher in boiling point than water, in which the conductive solid can be dispersed, can be adopted as the second solvent.

In addition, water may be mixed in the second solvent. If the second solvent is a solvent mixture with water, it is considered that performance in dispersing the conductive solid is further enhanced. If a ratio of mixture of water in the second solvent is too high, however, flowability of the conductive solid which will be described later is lowered and hence the ratio of mixture of water is preferably 50% or lower.

A method of washing anode element 21 with the second solvent is not particularly limited. For example, a method of immersing anode element 21 in the second solvent accommodated in a container is preferably used, because an operation is relatively easy.

The present inventor has found that characteristics of solid electrolytic capacitor 100 can be improved by washing anode element 21 having conductive polymer layer 23 formed thereon with the second solvent as described above. The reason therefor is unclear, however, a hypothesis as follows can be made.

Figure 3A:
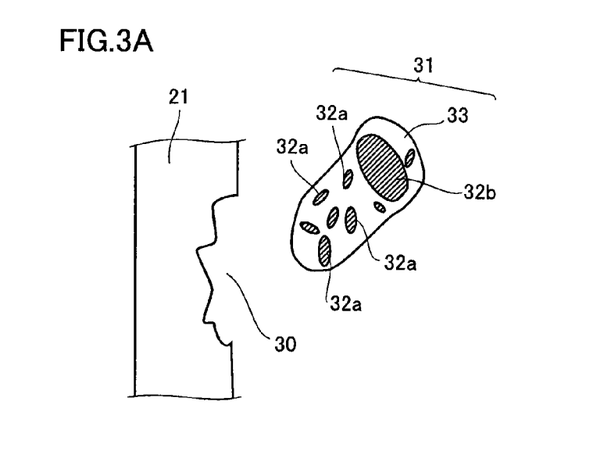
FIGS. 3A to 3C are conceptual diagrams for illustrating an effect of a washing step.
Figure 3B:
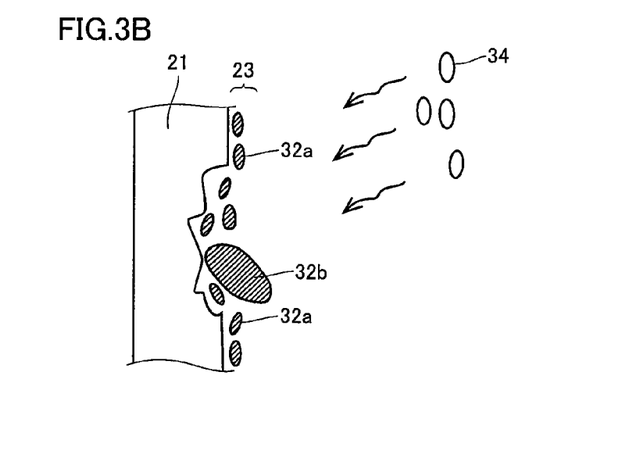
Figure 3C:
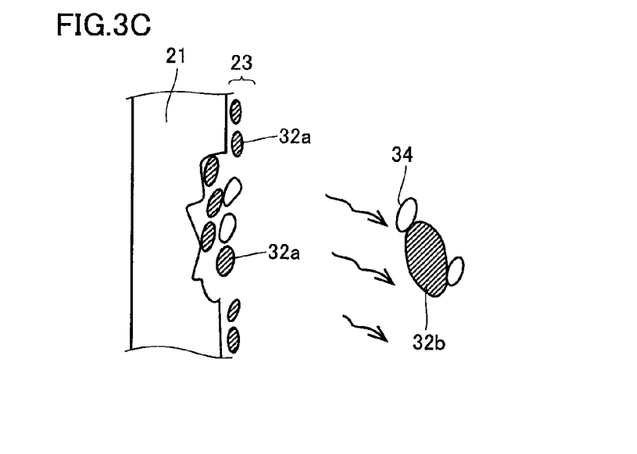

FIGS. 3A to 3C are conceptual diagrams for illustrating an effect of the washing step.

As shown in FIG. 3A, generally, a hole 30 is present in the surface of anode element 21 having dielectric film 22 formed thereon. Hole 30 here refers to a pit formed as a result of etching of anode element 21 in order to increase a capacitance of solid electrolytic capacitor 100, and dielectric film 22 is formed also on the surface in hole 30.

Meanwhile, a size of a particle or a size of an aggregate of the conductive solid in a dispersion 31 is varied. In dispersion 31, a conductive solid 32a in a state of a relatively small particle and a conductive solid 32b in a state of a particle larger than conductive solid 32a are present in a first solvent 33 in a mixed manner.

Therefore, after the step of forming a conductive polymer layer described above, not only conductive solid 32a but also conductive solid 32b adhere to the surface of anode element 21 as shown in FIG. 3B. Since conductive solid 32b is a particle or an aggregate larger than other conductive solids 32a, hole 30 in anode element 21 is unevenly filled with large conductive solid 32b and conductive polymer layer 23 becomes uneven. In this case, the cathode layer cannot enter hole 30 and come in contact therewith, and a capacitance in a region of hole 30 cannot be extracted. Therefore, characteristics of solid electrolytic capacitor 100 are lowered.

In contrast, in the present embodiment, anode element 21 having conductive polymer layer 23 as shown in FIG. 3B is washed with a second solvent 34 described above. Change in conductive polymer layer 23 at this time is shown in FIG. 3C. As described above, since second solvent 34 has a property that conductive solids 32a and 32b can be dispersed therein, large conductive solid 32b not adhering to anode element 21 is dispersed in second solvent 34 and removed from conductive polymer layer 23. Alternatively, large conductive solid 32b itself can be dispersed in second solvent 34, so that conductive solid 32b is dispersed again in second solvent 34 and it is reconstructed as a small particle or aggregate. Therefore, it is considered that the conductive solid that has formed large conductive solid 32b in FIG. 3C is removed or adheres again onto anode element 21 as a small particle or aggregate.

In addition, it is possible that conductive solid 32a within hole 30 is low in a degree of adhesion than conductive solid 32a arranged in other portions, due to the presence of large conductive solid 32b. It is considered that second solvent 34 is also able to rearrange conductive solid 32a within hole 30 low in a degree of adhesion, and consequently, conductive solid 32a within hole 30 can be moved and rearranged evenly, to thereby adhere again onto anode element 21.

Such functions as dispersion again/adhesion again or removal of large conductive solid 32b and rearrangement/adhesion again of conductive solid 32a within hole 30 are considered to be achieved because the second solvent is higher in boiling point than the first solvent; in other words, the second solvent is less likely to evaporate than the first solvent, and hence flowability of the conductive solid can be maintained for a long period of time. Such a function can achieve even conductive polymer layer 23 and resultant improvement in the characteristics of the solid electrolytic capacitor.

The present washing step is performed after the step of forming a conductive polymer layer described above. If the step of forming a conductive polymer layer is repeated a plurality of times, however, the washing step may be interposed at any time during repetition and the washing step should only be interposed at least once during repetition. In addition, if the washing step is interposed at least once in between the repeated steps of forming a conductive polymer layer, the washing step is preferably performed in an early stage, that is, in a stage small in the number of times of repetition. For example, if the washing step is performed after the step of forming a conductive polymer layer is performed once and thereafter the step of forming a conductive polymer layer is repeated, the characteristics of the solid electrolytic capacitor can effectively be improved.

Further, in the step of forming a conductive polymer layer before the washing step, it is not necessary to dry the first solvent. In this case, however, since a degree of adhesion of the conductive solid to the anode element seems to be low, such adjustment as making shorter a time period for immersing the anode element to which the dispersion adheres in the second solvent is preferably made.

In addition, the present inventor has found that, in manufacturing a solid electrolytic capacitor having a prescribed capacity, the number of times of repetition of the step of forming a conductive polymer layer in the case of performing the present washing step may be smaller than the number of times of repetition thereof in the case not performing the present washing step. Though the reason therefor is unclear, it is considered that a large conductive solid is removed by washing and introduction of the conductive solid into the hole in the anode element is facilitated, and consequently, the small number of times of repetition of the step of forming a conductive polymer layer, that is, the small number of times of immersion in the dispersion, can still allow fabrication of a solid electrolytic capacitor having a desired capacity.

<<Drying Step>>

Then, in the drying step, anode element 21 is dried at a temperature not lower than the boiling point of the first solvent and lower than the boiling point of the second solvent, after the washing step above.

In this step, only the first solvent that remained on anode element 21 is removed and the second solvent present on anode element 21 partially remains without being completely removed. Since the remaining second solvent is higher in boiling point than the first solvent, the second solvent is slowly and gradually removed, for example, in the repeated step of forming a conductive polymer layer after the drying step.

Therefore, in the present drying step, conductive polymer layer 23 can be dried and formed while flowability of the conductive solid is maintained with the second solvent remaining on anode element 21. It is thus considered that conductive polymer layer 23 can be denser while an uneven portion of conductive polymer layer 23 is reconstructed.

According to the method of manufacturing a solid electrolytic capacitor in the present embodiment described above, evenness of the conductive polymer layer formed with the dispersion can be improved and consequently a solid electrolytic capacitor having high characteristics can be manufactured.

The method of manufacturing a solid electrolytic capacitor according to the present invention is not limited to manufacturing of a solid electrolytic capacitor according to the embodiment above, and it is applicable to a method of manufacturing a solid electrolytic capacitor in known other forms. Examples of known other forms include a chip-type solid electrolytic capacitor, a wound-type solid electrolytic capacitor, and the like. In the case of a chip-type solid electrolytic capacitor, a dispersion is brought in contact with a sintered object having a dielectric film thereon and thereafter the sintered object can be washed with a second solvent. In the case of a wound-type solid electrolytic capacitor, after a wound body formed by winding an anode foil and a cathode foil with a separator being interposed therebetween is impregnated with a dispersion, the wound body can be washed with a second solvent.

EXAMPLES

Example 1

<<Preliminary Preparation>>

(1) Preparation of Dispersion

A solution mixture obtained by dissolving 3,4-ethylenedioxythiophene and polystyrene sulfonate serving as a dopant in ion exchanged water serving as the first solvent was prepared. While stirring the obtained solution mixture, a ferric p-toluenesulfonate solution serving as the oxidizing agent dissolved in ion exchanged water was added thereto, to thereby obtain a reaction liquid. Then, the obtained reaction liquid was dialyzed to remove unreacted monomer and excessive oxidizing agent, to thereby obtain a solution containing polyethylenedioxythiophene doped with approximately 5 mass % polystyrene sulfonate. Then, imidazole was homogeneously dispersed in this solution, to thereby obtain the dispersion.

(2) Fabrication of Anode Element Having Dielectric Film Thereon

Chemical conversion treatment was performed by immersing a large-sized aluminum foil having a thickness of 0.1 mm in an ammonium adipate aqueous solution and applying a voltage of 3 V, to thereby form an aluminum oxide film serving as the dielectric film on the surface of the aluminum foil. Then, this aluminum foil was cut into a size of 6 mm long×3.5 mm wide, and the cut surface was subjected to chemical conversion treatment as described above, to thereby fabricate the anode element.

<<Fabrication of Conductive Polymer Layer>>

Figure 4:
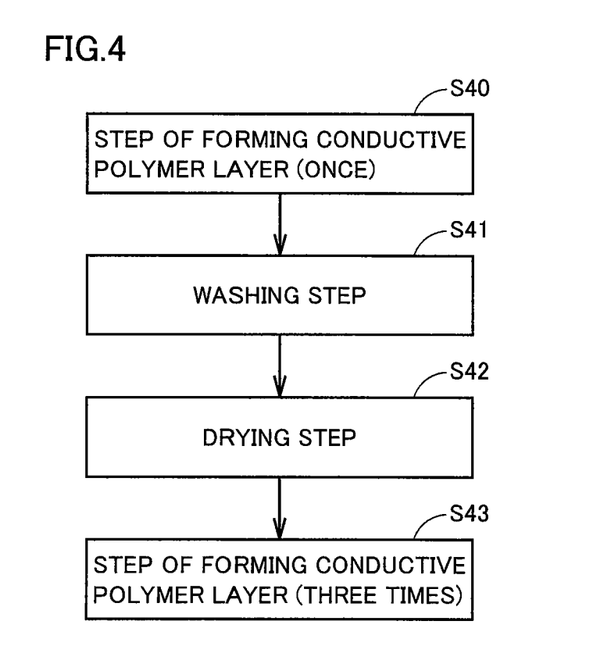
FIG. 4 is a flowchart showing a treatment procedure in fabricating a conductive polymer layer in Example 1.

Then, the fabricated anode element and the prepared dispersion were used to fabricate a conductive polymer layer. FIG. 4 is a flowchart showing a treatment procedure in fabricating a conductive polymer layer in Example 1. Fabrication of the conductive polymer layer will be described hereinafter with reference to FIG. 4.

(1) Step of Forming Conductive Polymer Layer (First Time)

Initially, in step S40 in FIG. 4, the anode element was immersed in the dispersion for 5 minutes and thereafter the anode element was brought up from the dispersion at a rate of 1 mm/s. Then, the brought-up anode element was placed in an oven and dried for 10 minutes at 100° C.

(2) Washing Step

Then, in step S41, the dried anode element was immersed in propylene carbonate (PC), which is the second solvent, and thereafter the anode element was brought up from propylene carbonate at a rate of 1 mm/s.

(3) Drying Step

Then, in step S42, the anode element brought up from propylene carbonate was placed in an oven and dried for 10 minutes at 150° C.

(4) Step of Forming Conductive Polymer Layer (Second to Fourth Times)

Then, in step S43, the treatment the same as in the step of forming a conductive polymer layer (first time) was repeated three times. Therefore, finally, an operation for immersing the anode element in the dispersion was performed four times.

<<Fabrication of Other Components>>

A carbon layer and a silver paste layer were stacked with a known method on the conductive polymer layer fabricated in the steps above, to thereby fabricate a capacitor element. Three such capacitor elements were fabricated. As shown in FIG. 1, the capacitor elements were stacked, the cathode terminal was arranged between the cathode portions, and adjacent members were bonded and fixed to each other by interposing a conductive paste between the cathode portion and the cathode terminal of the three stacked capacitor elements. In addition, the anode terminal was arranged between the anode portions of the capacitor elements and the anode portion and the anode terminal of the three stacked capacitor elements were press-fitted and formed.

Then, epoxy resin was used as the exterior resin, and each member was covered by using a transfer molding method so as to expose one ends of the cathode terminal and the anode terminal Then, the cathode terminal and the anode terminal exposed through the exterior resin were bent along the side surface and the bottom surface of the molded exterior resin and dicing was finally performed. The solid electrolytic capacitor structured as shown in FIG. 1 was thus completed.

Example 2

The solid electrolytic capacitor was fabricated in accordance with the treatment procedure as in Example 1, except for using propylene carbonate containing 50 wt % water as the second solvent.

Example 3

The solid electrolytic capacitor was fabricated in accordance with the treatment procedure as in Example 1, except that the washing step was performed not only after the step of forming a conductive polymer layer for the first time but also after the step of forming a conductive polymer layer for the second time.

Examples 4 to 7

The solid electrolytic capacitors were fabricated in accordance with the procedure as in Example 1, except for using as the second solvent, γ-butyrolactone (γ-BL) in Example 4, N-methyl-2-pyrrolidone (NMP) in Example 5, ethylene glycol (EG) in Example 6, and propylene glycol (PG) in Example 7, respectively.

Example 8

The solid electrolytic capacitor was fabricated in accordance with the procedure as in Example 1, except that ethylene glycol monoethyl ether (EGmEE) was employed as the second solvent and the drying step after the washing step was performed at 100° C.

Comparative Example 1

The solid electrolytic capacitor was fabricated in accordance with the procedure as in Example 1, except that the step of forming a conductive polymer layer was repeated seven times without performing the washing step.

Comparative Example 2

The solid electrolytic capacitor was fabricated in accordance with the procedure as in Example 1, except for using ethanol as the second solvent.

Comparative Example 3

The solid electrolytic capacitor was fabricated in accordance with the procedure as in Comparative Example 2, except that the step of forming a conductive polymer layer was repeated six times after the drying step. Therefore, finally, an operation for immersing the anode element in the dispersion was performed seven times.

Comparative Example 4

The solid electrolytic capacitor was fabricated in accordance with the procedure as in Comparative Example 3, except that the drying step after the washing step was performed at 100° C. Therefore, finally, an operation for immersing the anode element in the dispersion was performed seven times.

Comparative Example 5

The solid electrolytic capacitor was fabricated in accordance with the procedure as in Example 8, except that the drying step after the washing step was performed at 150° C. and the step of forming a conductive polymer layer after the drying step was repeated six times. Therefore, finally, an operation for immersing the anode element in the dispersion was performed seven times.

Comparative Example 6

The solid electrolytic capacitor was fabricated in accordance with the procedure as in Example 1, except that 1,5-pentanediol (1,5-PD) having high viscosity was employed as the second solvent and the step of forming a conductive polymer layer after the drying step was repeated six times. Therefore, finally, an operation for immersing the anode element in the dispersion was performed seven times.

<Performance Evaluation>
<<Capacitance>>

Capacitance (μF) at a frequency of 120 Hz, of 50 solid electrolytic capacitors in each Example and each Comparative Example was measured by using an LCR meter for 4-terminal measurement. An average value of measurement results was calculated.

<<ESR Value>>

ESR (mΩ) at a frequency of 100 kHz, of 50 solid electrolytic capacitors in each Example and each Comparative Example was measured by using an LCR meter for 4-terminal measurement. An average value of measurement results was calculated.

<<LC Value>>

A rated voltage was applied for 2 minutes to 50 solid electrolytic capacitors in each Example and each Comparative Example and a leakage current amount of each solid electrolytic capacitor thereafter was measured. It is noted that the rated voltage of each solid electrolytic capacitor was 2.0 V.

For facilitating comparison among Examples 1 to 8 and Comparative Examples 1 to 6 above, Table 1 summarizes types of the second solvents used in the Examples, properties of the second solvents, manufacturing conditions, and results of measured values, and Table 2 summarizes types of the second solvents used in the Comparative Examples, properties of the second solvents, manufacturing conditions, and results of measured values.

TABLE 1

|  |  | Example 1 | Example 2 | Example 3 | Example 4 | Example 5 | Example 6 | Example 7 | Example 8 |
| --- | --- | --- | --- | --- | --- | --- | --- | --- | --- |
| Organic Solvent | Type | PC | PC + Water | PC | γ-BL | NMP | EG | PG | EGmEE |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | Viscosity (mPas) | 1.4 | — | 1.4 | 1.7 | 1.7 | 25.7 | 56 | 2.1 |
|  | Boiling Point (°C.) | 242 | — | 242 | 204 | 202 | 197 | 187.4 | 136 |
| Manufacturing Condition | The Number of Times of Washing (times) | 1 | 1 | 2 | 1 | 1 | 1 | 1 | 1 |
|  | Drying Temperature (°C.) | 150 | 150 | 150 | 150 | 150 | 150 | 150 | 100 |
|  | Total Number of Times of Immersion (times) | 4 | 4 | 4 | 4 | 4 | 4 | 4 | 4 |
| Performance | Capacitance (μF) | 96.9 | 101.4 | 103.2 | 97.8 | 95.4 | 98.7 | 94.5 | 98.4 |
|  | ESR Value (mΩ) | 13.9 | 12.2 | 13 | 13.4 | 13.5 | 14.3 | 14.5 | 13.7 |
|  | LC Value (μA) | 2.9 | 2.7 | 1.5 | 2.1 | 2.2 | 3.3 | 3.1 | 2.9 |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Organic Solvent | Type | — | Ethanol | Ethanol | Ethanol | EGmEE | 1.5-PD |
|  | Viscosity (mPas) | — | 1.1 | 1.1 | 1.1 | 2.1 | 128 |
|  | Boiling Point (°C.) | — | 78.3 | 78.3 | 78.3 | 136 | 238 |
| Manufacturing Condition | The Number of Times of Washing (times) | — | 1 | 1 | 1 | 1 | 1 |
|  | Drying Temperature (°C.) | — | 150 | 150 | 100 | 150 | 150 |
|  | Total Number of Times of Immersion (times) | 7 | 4 | 7 | 7 | 7 | 7 |
| Performance | Capacitance (μF) | 88.2 | 59.1 | 60.9 | 89.1 | 70.5 | 77.7 |
|  | ESR Value (mΩ) | 16.3 | 23.6 | 20.4 | 19.6 | 19.9 | 24.5 |
|  | LC Value (μA) | 7.2 | 43.2 | 15.8 | 9.2 | 10.8 | 36 |

When Example 1 and Comparative Example 1 are compared with each other, the result exhibited that the capacitance was higher, the ESR value was lower, and the LC value was lower, that is, the characteristics of the solid electrolytic capacitor were higher by performing the washing step using propylene carbonate than in the case where the washing step was not performed, despite the smaller number of times of immersion in the dispersion. This may be because, evenness of the conductive polymer layer was improved by washing the conductive polymer layer with propylene carbonate in which the conductive solid can readily be dispersed and by drying the washed anode element at a temperature higher than the boiling point of water which is the first solvent and lower than the boiling point of propylene carbonate. Therefore, by performing the washing step, not only characteristics of the solid electrolytic capacitor are improved but also the manufacturing process can be simplified.

In addition, when Example 1 and Example 2 are compared with each other, the result exhibited that characteristics of the solid electrolytic capacitor were higher in the example where water was contained in propylene carbonate than in the example where propylene carbonate was used in the washing step. This may be because propylene carbonate containing water has higher dispersibility of the conductive solid and higher miscibility with water on the anode element.

Moreover, when Example 1 and Example 3 are compared with each other, the result exhibited that characteristics of the solid electrolytic capacitor were higher in the example where the washing step was performed twice than in the example where the washing step was performed once in between the repeated steps of forming a conductive polymer layer. This may be because efficiency in removal or dispersion again of a large conductive solid as shown in FIG. 3 was enhanced.

Further, it is considered that characteristics of the solid electrolytic capacitor were higher in the example where the washing step is performed after performing the step of forming a conductive polymer layer once as in Example 1 than in the example where the washing step is performed after performing the step of forming a conductive polymer layer a plurality of times. This is because densification or the like of the conductive polymer layer by repeating the step of forming a conductive polymer layer is efficiently achieved by suppressing in an early stage, filling of the hole in the anode element with a large conductive solid.

Furthermore, it was found from Examples 4 to 8 that characteristics of the manufactured solid electrolytic capacitor are improved by performing the washing step with the use of various second solvents higher in boiling point than water, in which the conductive solid can readily be dispersed.

In addition, when Example 1 is compared with Comparative Example 2, it was found that characteristics of the solid electrolytic capacitor was poorer in the example where ethanol was employed as the second solvent than in the example where propylene carbonate was employed. Moreover, the solid electrolytic capacitor in Comparative Example 2 was lower in characteristics than the solid electrolytic capacitor in Comparative Example 1. It is considered that a second solvent extremely high in molecular polarity such as ethanol is poor in substantial dispersibility of the conductive solid on the anode element. Further, it is considered that ethanol cannot maintain flowability of the conductive solid on the anode element for a long period of time because ethanol is lower in boiling point than water.

Furthermore, characteristics of the solid electrolytic capacitor could not be improved as in Examples 1 to 8 when ethanol was used as the second solvent, even though the number of times of performing the step of forming a conductive polymer layer is increased as in Comparative Example 3, or the number of times of performing the step of forming a conductive polymer layer is increased and a drying temperature in the drying step following the washing step is lowered as in Comparative Example 4.

When Example 8 is compared with Comparative Example 5, it was found that characteristics of the solid electrolytic capacitor were poorer in the example where the drying temperature after the washing step was equal to or higher than the boiling point of the second solvent than in the example where it was lower than the boiling point of the second solvent. In addition, the solid electrolytic capacitor according to Comparative Example 5 was poorer in characteristics than the solid electrolytic capacitor according to Comparative Example 1. Therefore, it was found that it is important to perform the drying step following the washing step at a temperature lower than the boiling point of the second solvent.

Further, 1,5-pentanediol having viscosity exceeding 100 mPas was employed in Comparative Example 6, and characteristics of the solid electrolytic capacitor here were lower than in Example 1 and lower than in Comparative Example 1. This may be because substantial dispersibility of the conductive solid on the anode element is poor when the second solvent has viscosity exceeding 100 mPas. In addition, it is considered that it is also difficult to maintain flowability of the conductive solid if viscosity is equal to higher than 100 mPas.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing an electrolytic capacitor including an anode element having a dielectric film formed on its surface and a conductive polymer layer formed on said dielectric film, comprising the steps of:
    adhering particles made of conductive polymer or aggregates made of conductive polymer onto said anode element by bringing a dispersion in which said particles made of conductive polymer or aggregates made of conductive polymer are dispersed in the first solvent into contact with said anode element having said dielectric film formed thereon;
    bringing a second solvent higher in boiling point than said first solvent into contact with said particles made of conductive polymer adhered onto said anode element or said aggregates made of conductive polymer adhered onto said anode element;
    drying said anode element at a temperature not lower than the boiling point of said first solvent after said second solvent is brought into contact with said particles made of conductive polymer or said aggregates made of conductive polymer.

2. The method of manufacturing an electrolytic capacitor according to claim 1, wherein
    in said step of adhering said particles made of conductive polymer or said aggregates made of conductive polymer onto said anode element, said anode element is dried after said dispersion is brought in contact with said anode element having said dielectric film formed thereon.

3. The method of manufacturing an electrolytic capacitor according to claim 1, wherein
    said step of adhering said particles made of said conductive polymer or said aggregates made of said conductive polymer onto said anode element is repeated a plurality of times, and a series of steps including the step of bringing said second solvent into contact with said particles made of conductive polymer or said aggregates made of conductive polymer and the step of drying said anode element at a temperature not lower than the boiling point of said first solvent is performed at least once in between the repeated steps.

4. The method of manufacturing an electrolytic capacitor according to claim 1, wherein
    said first solvent is water or a solvent mixture mainly composed of water.

5. The method of manufacturing an electrolytic capacitor according to claim 1, wherein
    said second solvent has miscibility with said first solvent.

6. The method of manufacturing an electrolytic capacitor according to claim 1, wherein
    said second solvent has viscosity not higher than 100 mPas.

* * * * *